United States Patent
Nakayama (10) Patent No.: US 9,184,432 B2
(45) Date of Patent: Nov. 10, 2015

(54) CELL WIRING MODULE

(75) Inventor: Osamu Nakayama, Mie (JP)

(73) Assignees: AUTONETWORKS TECHNOLOGIES, LTD, Mie (JP); SUMITOMO WIRING SYSTEMS, LTD, Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/113,292

(22) PCT Filed: Jun. 1, 2012

(86) PCT No.: PCT/JP2012/064265
§ 371 (c)(1),
(2), (4) Date: Oct. 22, 2013

(87) PCT Pub. No.: WO2013/005516
PCT Pub. Date: Jan. 10, 2013

(65) Prior Publication Data
US 2014/0045388 A1 Feb. 13, 2014

(30) Foreign Application Priority Data
Jul. 5, 2011 (JP) ................................ 2011-149077

(51) Int. Cl.
*H01M 2/20* (2006.01)
*H01M 2/10* (2006.01)
*H01M 10/48* (2006.01)

(52) U.S. Cl.
CPC ............ *H01M 2/206* (2013.01); *H01M 2/1077* (2013.01); *H01M 10/482* (2013.01); *H01M 2220/20* (2013.01)

(58) Field of Classification Search
USPC .......... 439/765, 754, 274, 275; 136/256, 251, 136/246, 244
See application file for complete search history.

(56) References Cited

U.S. PATENT DOCUMENTS 6,127,622 A * 10/2000 Yamada et al. ................ 136/251
6,840,799 B2 * 1/2005 Yoshikawa et al. ........... 439/502
(Continued)

FOREIGN PATENT DOCUMENTS

DE   102009033044    3/2010
EP       0986114     3/2000
(Continued)

OTHER PUBLICATIONS

International Search Report, mail date is Sep. 11, 2012.
(Continued)

*Primary Examiner* — Alexander Gilman
(74) *Attorney, Agent, or Firm* — Greenblum & Bernstein, P.L.C.

(57) ABSTRACT

A cell wiring module has a plurality of connection members connecting adjacent electrode terminals of a plurality of single cells having positive and negative electrode terminals, a plurality of holding portions holding the connection members, voltage detection terminals placed on the connection members and connected to terminal portions of wires, and wire insertion portions through which the wires connected to the voltage detection terminals are inserted. The wires extend from the voltage detection terminals in the direction inclined relative to a direction orthogonal to a connecting direction of the connection members. The wires extending in this direction are inserted through the wire insertion portions.

13 Claims, 10 Drawing Sheets

(56) References Cited

U.S. PATENT DOCUMENTS

| | | | |
|---|---|---|---|
| 7,604,507 B1 | 10/2009 | Millon | |
| 8,383,943 B2 * | 2/2013 | Little et al. | 174/72 A |
| 8,905,783 B2 * | 12/2014 | Umemoto et al. | 439/587 |
| 2010/0055993 A1 | 3/2010 | Ikeda et al. | |
| 2011/0008669 A1 | 1/2011 | Ogasawara et al. | |

FOREIGN PATENT DOCUMENTS

| | | |
|---|---|---|
| JP | 2009-76412 | 4/2009 |
| JP | 2010-170884 | 8/2010 |
| JP | 2011-18478 | 1/2011 |
| JP | 2011-18499 | 1/2011 |
| JP | 2011-77031 | 4/2011 |
| JP | 2011-91003 | 5/2011 |
| JP | 2012-64455 | 3/2012 |
| WO | 2012/036317 | 3/2012 |

OTHER PUBLICATIONS

Search report from E.P.O., mail date is Apr. 7, 2015.

* cited by examiner

CELL WIRING MODULE

TECHNICAL FIELD

The present invention relates to a cell wiring module.

BACKGROUND ART

In a cell module for electric automobiles or hybrid automobiles, a plurality of single cells having positive and negative electrode terminals are aligned. The electrode terminals of the adjacent single cells are connected by bus bars (connection members), and thus the plurality of single cells are connected in series or parallel (refer to Patent Literature 1).

In a bus bar module (cell wiring module) of Patent Literature 1, a square voltage detection terminal is placed on a bus bar to detect voltage of a single cell. A wire connected to the voltage detection terminal is directed to a cell ECU.

CITATION LIST

Patent Literature

Patent Literature 1: Japanese Patent Laid-Open Publication No. 2010-170884

SUMMARY OF INVENTION

Technical Problem

According to a configuration of Patent Literature 1, the wire connected to the voltage detection terminal is extended along with a wire connection portion in a direction orthogonal to a connecting direction of the bus bar, and is then bent at substantially a right angle in a second housing and is directed to the cell ECU side. In a case, however, where the wire extends in the direction orthogonal to the connecting direction of the bus bar as above, a space is required for the wire and the wire connection portion, thus likely interfering with size reduction of the cell wiring module.

The present invention is perfected in view of the circumstances above and is intended to reduce a size of a cell wiring module.

Solution to Problem

A cell wiring module according to the present invention includes a plurality of connection members connecting adjacent electrode terminals of a plurality of single cells having positive and negative electrode terminals, a plurality of holding portions holding the connection members, detection terminals placed on the connection members and connected to terminal portions of wires, and wire insertion portions through which the wires connected to the detection terminals are inserted. The wires extend from the detection terminals in a direction inclined relative to a direction orthogonal to a connecting direction of the connection members, and the wires extending in this direction are inserted through the wire insertion portions.

According to the configuration of the present invention, compared to a case where the wires extend in the direction orthogonal to the connecting direction of the connection members, it is unnecessary to secure a space in the direction orthogonal to the connecting direction of the connection members by an amount of inclination of the extending direction relative to the direction orthogonal to the connecting direction of the connection members. Thus, the cell wiring module can be reduced in size.

The wires do not extend in the connecting direction of the connection members.

When the wires extend in the connecting direction of the connection members, the wires are likely to be long. In the present configuration, however, the wires can be prevented from being lengthened.

The wire insertion portions are provided along the plurality of holding portions, and the wires extend toward the wire insertion portions.

When the wires extend opposite to the wire insertion portions, the wires are lengthened. In the present configuration, however, the length of the wires can be shortened.

The holding portion has a partition wall separating the connection member from an exterior. The detection terminal has a flat plate portion placed on the connection member. Corner portions of the flat plate portion are inserted in the partition wall.

This enables the size of the cell wiring module to be reduced by an amount that the corner portions of the flat plate portion are inserted in the partition wall.

The partition wall has recesses to which the corner portions of the flat plate portion are fitted.

The simple configuration enables the size of the cell wiring module to be reduced, and enables the recesses to prevent the detection terminal from rotating when being bolt-fastened.

An inner surface of the partition wall has through-recesses through which the corner portions of the flat plate portion are inserted.

The simple configuration enables the size of the cell wiring module to be reduced and can prevent the detection terminal from rotating when being bolt-fastened.

The through-recesses are through-holes passing through the partition wall.

This enables a further reduction in the size of the cell wiring module.

The partition wall has an auxiliary wall on an outer surface side of the partition wall, the auxiliary wall covering the corner portions of the flat plate portion inserted through the through-holes.

When the flat plate portion is exposed to the exterior, insulation performance becomes a concern. In the present configuration, however, the insulation performance can be prevented from deteriorating.

The plurality of holding portions have the plurality of detection terminals placed on the connection members. Of the plurality of detection terminals, the wire from the detection terminal in a first end portion in the connecting direction of the connection members extends to a second side in the connecting direction of the connection members.

In the end portion of the cell wiring module, the wire may protrude from the cell wiring module depending on the extending direction of the wire. According to the present configuration, however, of the plurality of detection terminals, the wire from the detection terminal in the first end portion in the connecting direction of the connection members extends to the second side in the connecting direction of the connection members. This can prevent protrusion of the wire from the cell wiring module.

The cell wiring module is configured by linking a plurality of link units, each link unit having the holding portion and the wire insertion portion. When the link units are linked, the wire insertion portions of the adjacent link units are connected.

In a case where the cell wiring module is integrally molded, a new mold and the like are required to accommodate a change in a configuration of the cell wiring module (change in length or the like) associated with a change in the number of single cells. According to the present configuration, however, the number of link units can be changed depending on the number of single cells, thus facilitating changes in the configuration of the cell wiring module.

Advantageous Effects of Invention

The present inventions achieves reduction in size of the cell wiring module.

DESCRIPTION OF EMBODIMENTS

<First Embodiment>

A first embodiment of the present invention is described below with reference to FIGS. 1 to 10.

Figure 1:
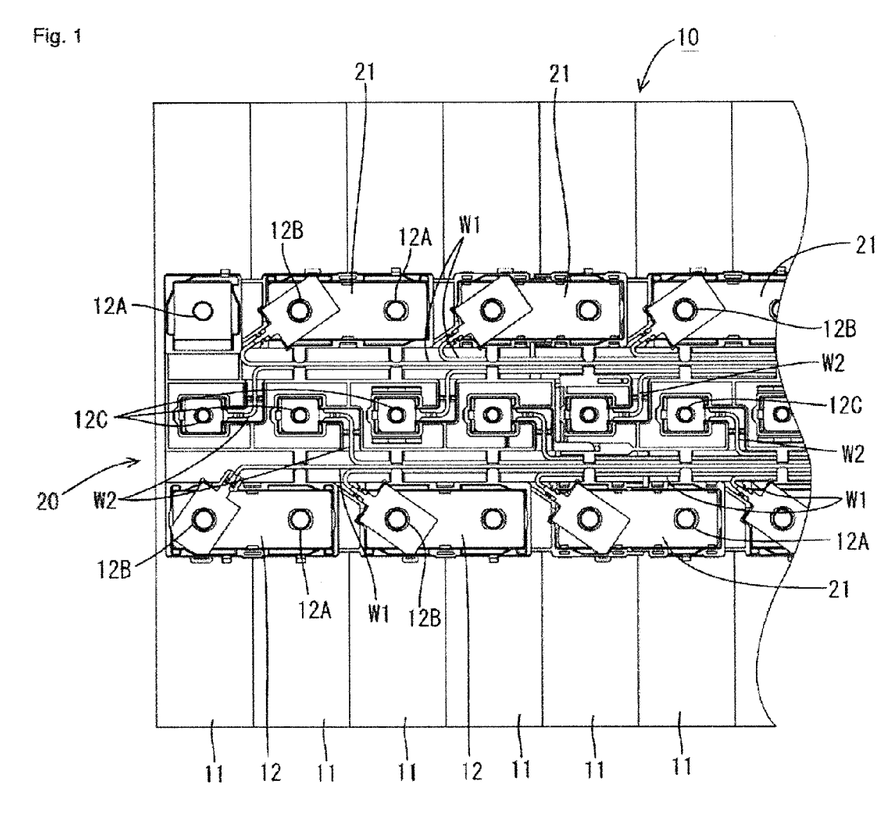
[FIG. 1] A partially omitted plan view of a cell module to which a cell wiring module according to a first embodiment is attached.

With reference to FIG. 1, a cell wiring module 20 according to the present embodiment is included in a cell module 10, the cell wiring module 20 being attached to a single cell group in which a plurality of single cells 11 are aligned. The cell module 10 is used as, for example, a drive source of an electric automobile or a hybrid automobile. With respect to a front-rear direction, an upside of FIG. 1 is deemed front and a downside thereof is rear hereinafter. A close side of a plane of paper of FIG. 1 is deemed up and a far side thereof is down.

With reference to FIG. 1, the cell module 10 includes the plurality of single cells 11 (single cell group) aligned laterally, for example, and the cell wiring module 20 attached to the plurality of single cells 11.

The single cell 11 has nut-shaped electrode terminals 12A and 12B (positive electrode 12A and negative electrode 12B in the drawing) and a nut-shaped intermediate electrode 12C, which perpendicularly project from an end surface of a parallelepiped main body containing a power generating element (not shown in the drawing) therein.

A direction of the polarity (positive and negative) of each single cell 11 is provided such that the adjacent single cells 11 are opposite to each other. Thus, the electrode terminals 12A and 12B heteropolar to each other are configured to be provided adjacently. The plurality of single cells 11 are fixated by a holding plate (not shown in the drawing).

Figure 2:
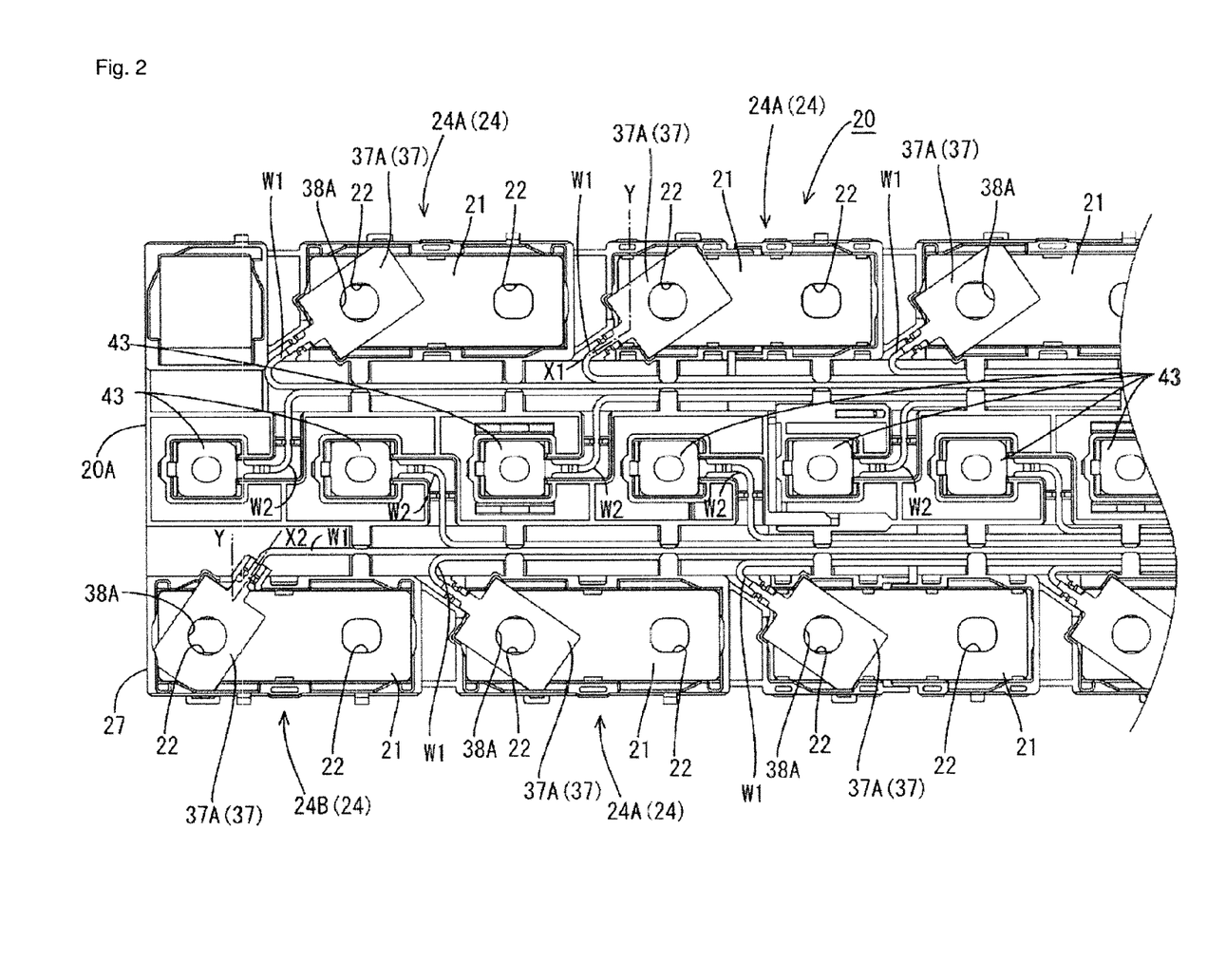
[FIG. 2] A partially omitted plan view of the cell wiring module.

With reference to FIG. 2, the cell wiring module 20 includes a plurality of connection members 21, a plurality of voltage detection terminals 37 (an example of the "detection terminal" included in the present invention), a plurality of intermediate voltage detection terminals 43, and a housing member 20A. The plurality of connection members 21 connect the left and right adjacent electrode terminals 12A and 12B. The plurality of voltage detection terminals 37 are placed on the connection members 21 and connected to terminal portions of wires W1 to detect voltage of the single cells 11. The plurality of intermediate voltage detection terminals 43 are connected to terminal portions of wires W2. The housing member 20A is composed of a synthetic resin and accommodates the connection members 21, the voltage detection terminals 37, and the intermediate voltage detection terminals 43.

The connection member 21 is composed of a metal, such as copper, copper alloy, aluminum, and the like, and has substantially a rectangular plate shape. The connection member 21 has through-holes 22 and 22 through which axes of bolts are inserted as fastening members. The through-holes 22 and 22 have an oval shape elongated in a left-right direction.

Figure 3:
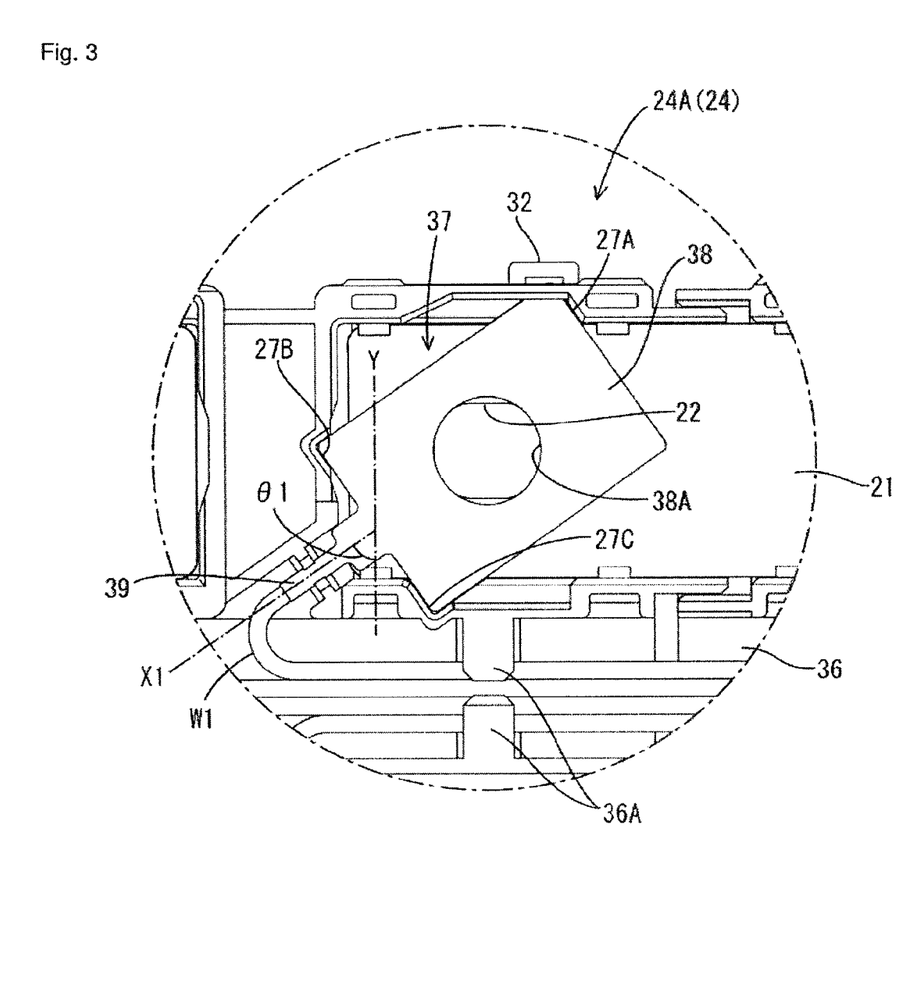
[FIG. 3] An enlarged view of a portion where a voltage detection terminal is attached.

The voltage detection terminal 37, which measures the voltage of the single cell 11, includes, as shown in FIG. 3, a flat plate portion 38 having a rectangular shape and a connection portion 39 extending from the flat plate portion 38 and connected to the terminal portion of the wire W1.

The flat plate portion 38 has four right-angle corner portions and a circular through-hole 38A in substantially a central portion that substantially overlaps with the through-hole 22 (having an identical center axis). The flat plate portion 38 has a long side in a direction along an extending direction X1 of the wire W1. The connection portion 39 (and the wire W1) extends from one short side of the flat plate portion 38.

The connection portion 39 is formed such that a width thereof narrows in a step shape from the short side (minor axis) of the flat plate portion 38. A conductive portion is connected by crimping or the like to the connection portion 39, the conductive portion being exposed by removing an insulation coating (insulating layer) from the terminal portion of the wire W1 that includes a coated wire.

The intermediate voltage detection terminal 43, which measures the voltage of an intermediate section of the single cell 11, includes, as shown in FIG. 2, a plate-shape rectangular portion smaller than the flat plate portion 38 of the voltage detection terminal 37 and a crimp portion extending from the rectangular portion and crimped to a conductive body exposed by removing an insulation coating from the terminal portion of the wire W2 that is a coated wire. The rectangular portion has a through-hole in a central portion through which an axis of a bolt is insertable.

The wires W1 and the wires W2 are bundled in wire insertion portions 36 (described later) and are directed to a cell ECU (not shown in the drawing) provided on a right-hand side. The cell ECU equipped with a microcomputer, a device, and the like has a known configuration to detect the voltage, current, temperature, and the like of the single cells 11 and to control charge/discharge of the single cells 11.

Figure 6:
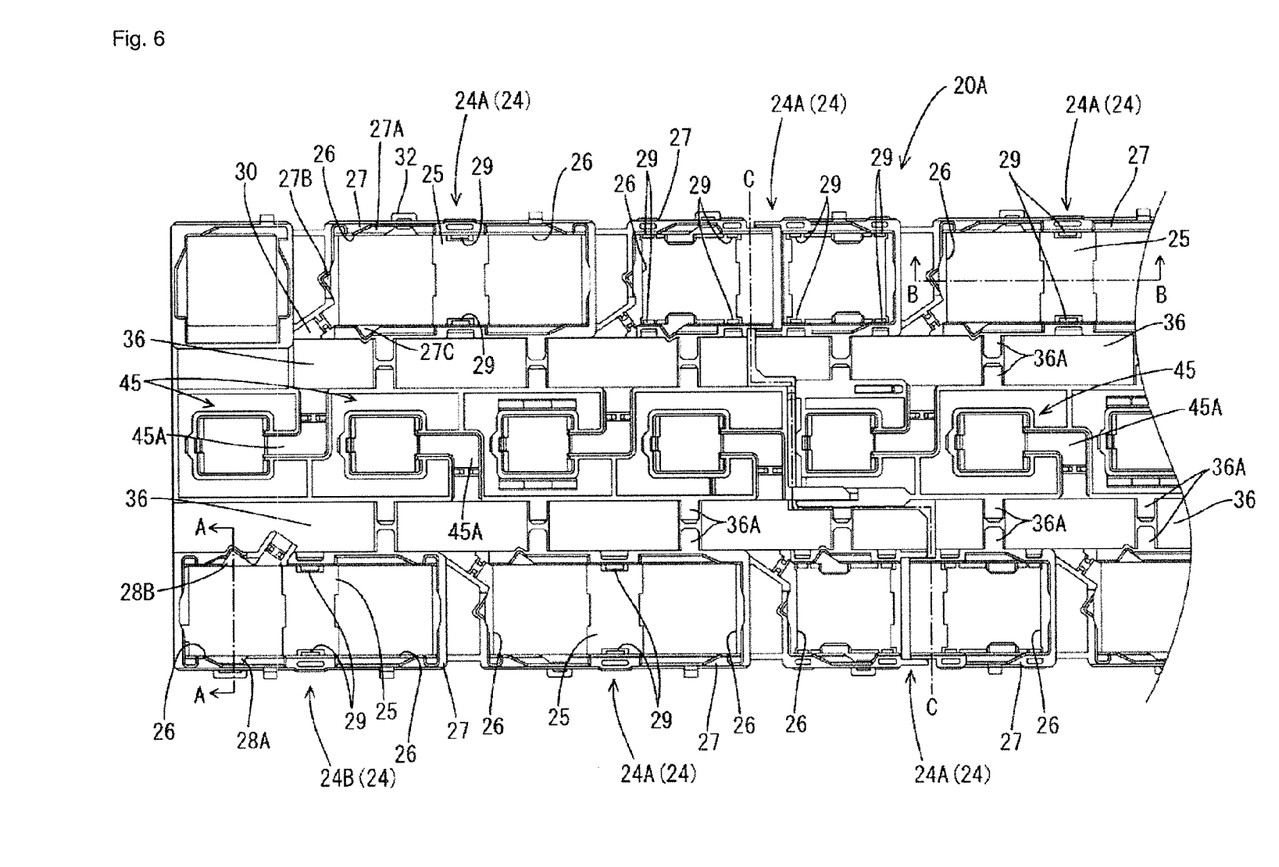
[FIG. 6] A partially omitted plan view of a housing member.

The housing member 20A includes, as shown in FIG. 6, a plurality of holding portions 24 holding the connection members 21, terminal housing portions 45 housing the intermediate voltage detection terminals 43, and the wire insertion portions 36 through which the wires W1 and the wires W2 are inserted.

The plurality of holding portions 24 are provided in a row on each of the front and rear sides of the housing member 20A. The holding portion 24 has a bottom plate 25 on which the connection member 21 is placed and a partition wall 27 surrounding the connection member 21.

The bottom plate 25 includes an intermediate support portion and a bottom edge portion. The intermediate support portion connects base end portions of front and back partition walls 27 at an intermediate portion in a width direction. The bottom edge portion slightly projects inward from the base end of the partition wall 27 at left and right end portions. A portion where the bottom plate 25 is not provided is an opening 26, where the electrode terminals 12A and 12B are provided.

To prevent a tool or the like from contacting and short-circuiting the electrode terminals 12A and 12B and the connection member 21, the partition wall 27 stands in an annular shape around the connection member 21 at a height that prevents contact with a tool or the like.

The annular partition wall 27 has a rectangular tubular shape including a front-rear pair of opposing walls extending in the left-right direction and a left-right pair of side walls extending in the front-rear direction, which are provided continuously.

The partition wall 27 (each opposing wall thereof) has a lock piece 29 flexible and deformable in the front-rear direction to regulate disengagement of the connection member 21. The connection member 21 is provided below portions where the lock pieces 29 project inward, and thus disengagement of the connection member 21 is regulated.

Figure 7:
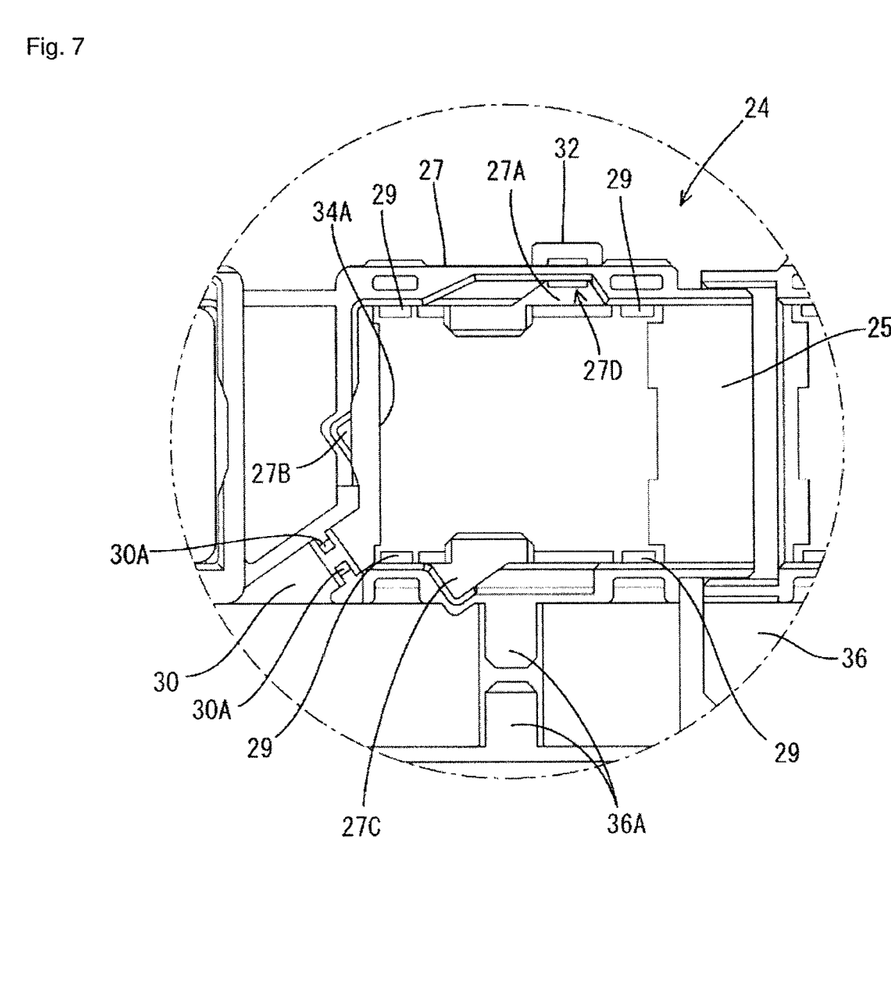
[FIG. 7] An enlarged view of a holding portion in the portion illustrated in FIG. 3.
Figure 8:
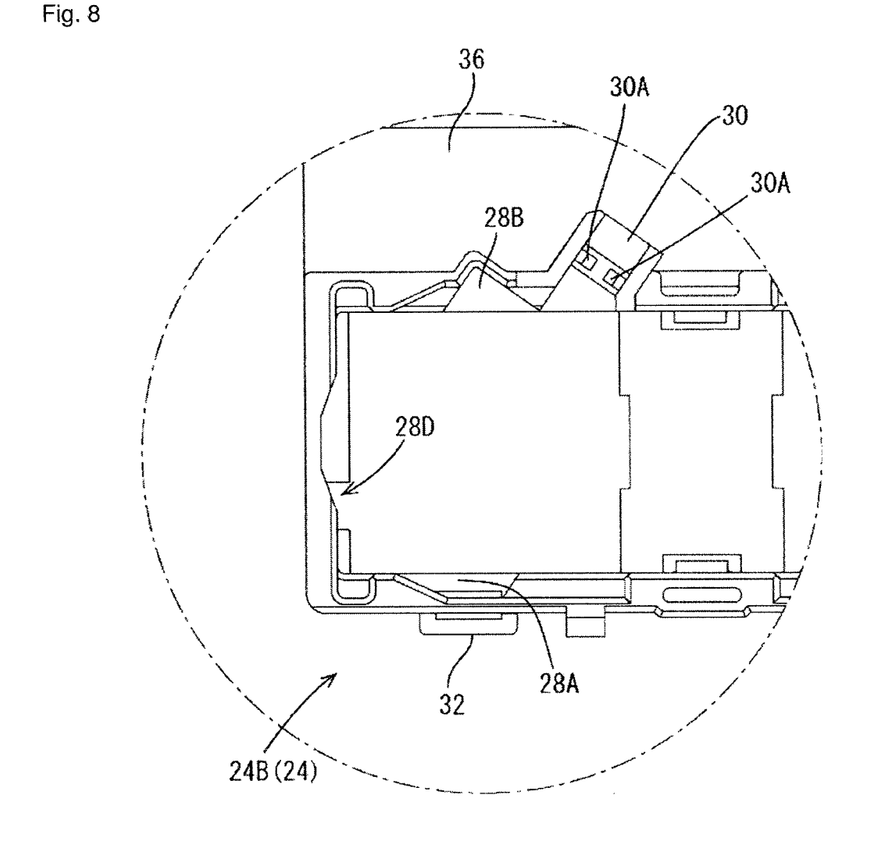
[FIG. 8] An enlarged view of a holding portion in the portion illustrated in FIG. 4.
Figure 9:
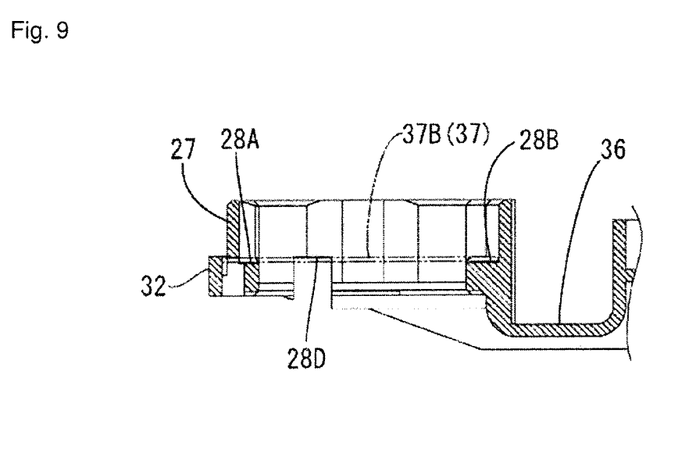
[FIG. 9] A cross-sectional view along A-A of FIG. 6.

Furthermore, as shown in FIG. 7, the partition wall 27 has recesses 27A, 27B, and 27C to which the corner portions of the flat plate portion 38 of the voltage detection terminal 37 are fitted from above, and a through-hole 27D (refer to FIG. 10) passing through the partition wall 27 and through which the other corner portion of the voltage detection terminal 37 is inserted.

The recesses 27A, 27B, and 27C are provided at a height position where the voltage detection terminal 37 is placed (position of an upper surface of the connection member 21). The recesses 27A, 27B, and 27C allow the flat plate portion 38 to be positioned (stopped from turning) in an orientation where a direction X1 of an axis of the voltage detection terminal 37 (center of a width direction of the flat plate portion 38) is inclined (angle θ1) relative to a front-rear direction Y (direction orthogonal to the connecting direction of the connection member 21). The recesses 27A, 27B, and 27C are provided by cutting out an upper surface and an inner surface of the partition wall 27 such that the three corner portions of the flat plate portion 38 are fitted thereto for positioning, as shown in FIG. 7. In the recesses 27B and 27C, the partition wall 27 has a frame shape that wraps around an outer side of the corner portions of the flat plate portion 38 to prevent the corner portions of the flat plate portion 38 from being exposed to an exterior of the partition wall 27.

The through-hole 27D is a slit-shaped through-hole through which the corner portion of the flat plate portion 38 can be inserted and is open in a diameter (vertical diameter) slightly greater than a thickness of the flat plate portion 38.

Figure 10:
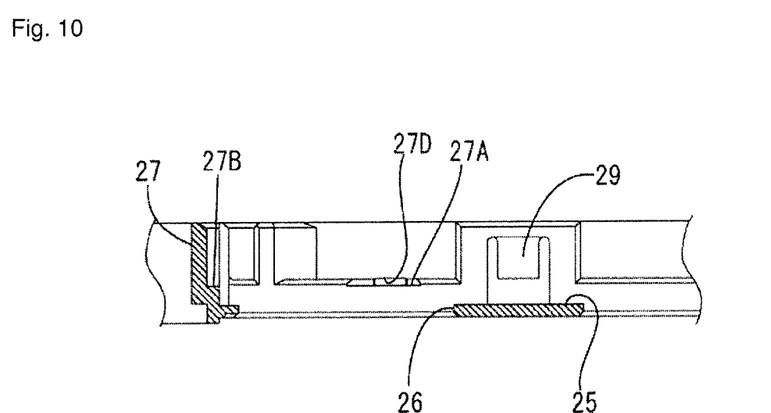
[FIG. 10] A cross-sectional view along B-B of FIG. 6.

An auxiliary wall 32 is provided on an outer surface side of the through-hole 27D provided in the partition wall 27 so as to cover the entire through-hole 27D. The auxiliary wall 32 is provided with a predetermined gap from an outer surface of the partition wall 27. The corner portion of the flat plate portion 38 inserted through the through-hole 27D is provided in an interior of the auxiliary wall 32. The auxiliary wall 32 is integrally connected to the partition wall 27 by narrowing a gap with the partition wall 27 in a step shape in the left-right direction.

In a position of the holding portion 24 where the corner portion of the partition wall 27 is included, a through-groove 30 is recessed through which the connection portion 39 of the voltage detection terminal 37 is inserted. The through-groove 30 has a pair of holding pieces 30A and 30A that hold the connection portion 39 of the voltage detection terminal 37 from both sides. The through-groove 30 is provided in a position of a corner of the holding portion 24 on wire insertion portion 36 side, so as to be connected (merged) in an inclined direction relative to the wire insertion portion 36.

Thus, when the voltage detection terminal 37 is mounted and the connection portion 39 is housed in the through-groove 30, the wire W1 (and the connection portion 39) extends from the voltage detection terminal 37 (flat plate portion 38 thereof) in the inclined direction (direction inclined at the angle θ1) relative to the front-rear direction Y (direction orthogonal to the connecting direction of the connection member 21), as shown in FIG. 3. The wire W1 extending in this direction is folded and curved, and then is inserted through the wire insertion portion 36.

Figure 4:
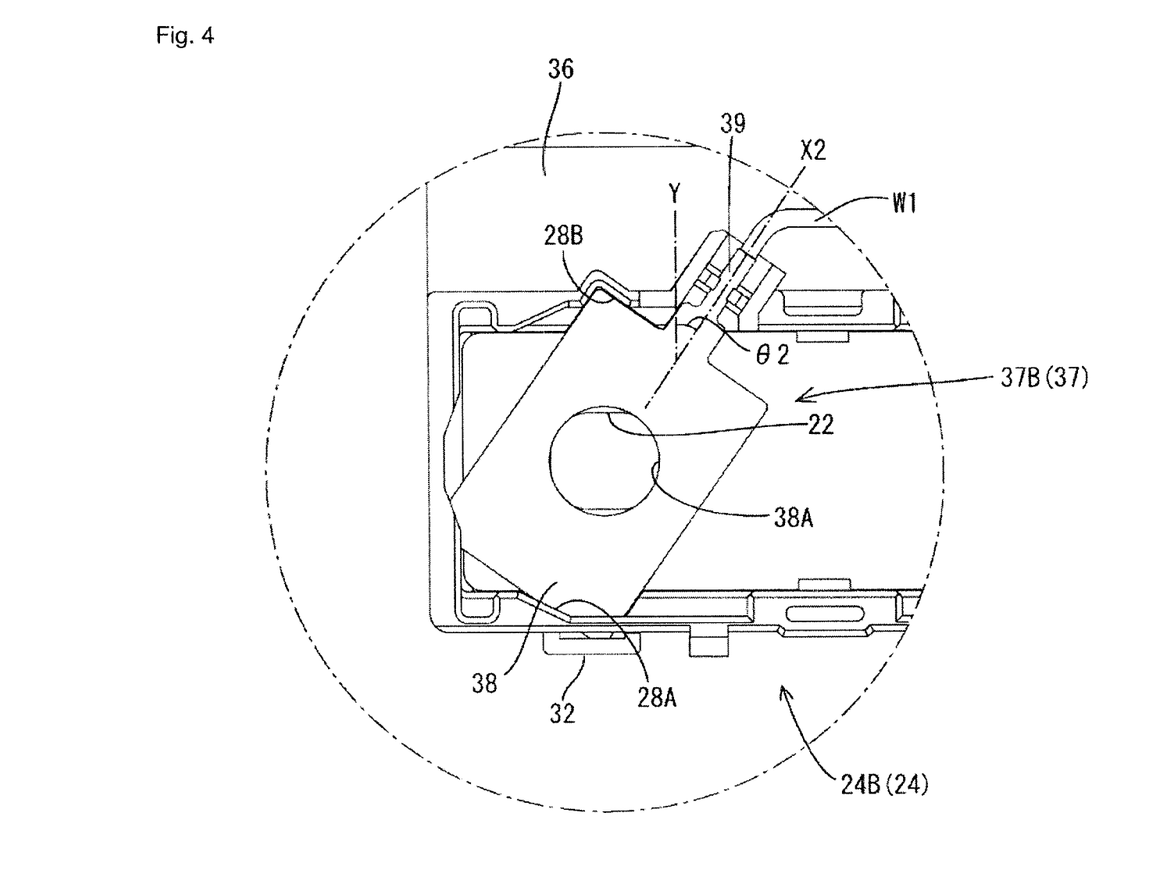
[FIG. 4] An enlarged view of a portion where a voltage detection terminal is attached in a different placement.
Figure 5:
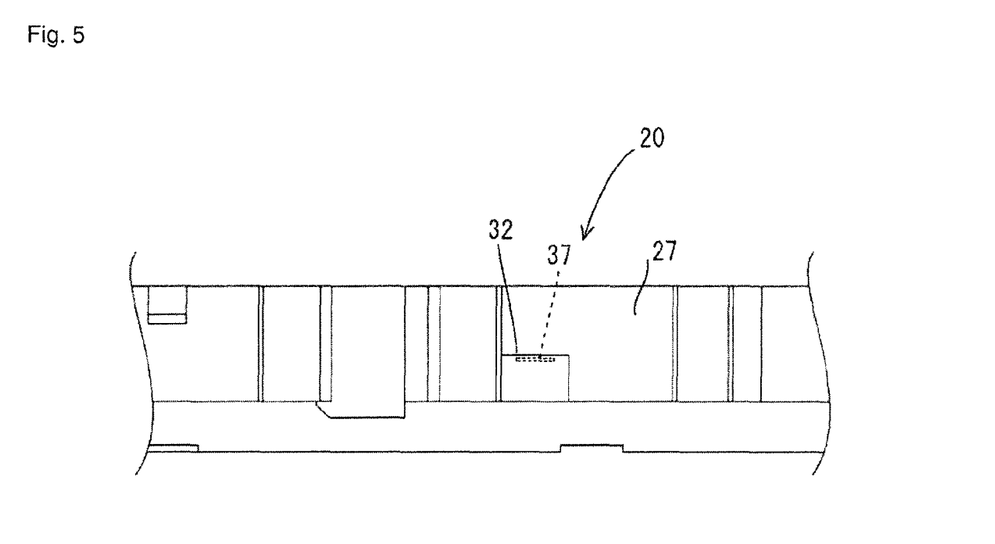
[FIG. 5] A partially enlarged front view of the cell wiring module.

For a voltage detection terminal 37B, which is mounted on a holding portion 24B in an end portion in the rear row of the holding portions 24, the wire W1 extends in a different direction X2 (θ2<θ1) from other voltage detection terminals 37A relative to the front-rear axis Y, shown in FIG. 4. Thus, recesses 28A and 28B to which corner portions of the voltage detection terminal 37B are fitted and a through-hole 28D through which the corner portion thereof is inserted are provided in the partition wall 27 in positions different from other holding portions 24A (refer to FIG. 8).

The terminal housing 45 is formed such that a mount recess 45A, on which the intermediate voltage detection terminal 43 is mounted, extends from the wire insertion portion 36, as shown in FIG. 6. The mount recess 45A has a rectangular opening for connection with the intermediate electrode 12C of the single cell 11. The intermediate voltage detection terminal 43 is mounted on the mount recess 45A, and then the wire W2 is inserted to the wire insertion portion 36.

The wire insertion portion 36 is provided in a groove shape both between the front holding portion 24 and the terminal housing 45 and between the terminal housing 45 and the rear holding portion 24 (two rows).

The wire insertion portion 36 has an opposing pair of tabs 36A in an upper portion to hold the wires W1 and W2 in the wire insertion portion 36.

The housing member 20A includes a plurality of link units (a boundary portion of the link units is denoted by C-C in FIG. 6). The link units are linked by the connection member 21. A recessed lock portion in the connection member 21 and a projecting lock portion in each link unit engage with a clearance therebetween, and thus offset a size tolerance between the left and right link units within a clearance range. When the link units are linked in the left-right direction, the wire insertion portions 36 of the adjacent link units are connected.

Assembly of the cell wiring module 20 is described below.

The plurality of link units are linked in the left-right direction to form the housing member 20A (FIG. 6).

Then, the connection members 21 and the intermediate voltage detection terminals 43 connected to the terminals of the wires W2 are mounted in the holding portions 24 and the terminal housings 45 of the housing member 20A. The corner portions of the voltage detection terminals 37 are respectively inserted through the through-holes 27D and 28D and fitted and mounted to the recesses 27A to 27C, 28A, and 27B; and the wires W1 and the wires W2 are inserted through the wire insertion portions 36. Thus, the cell wiring module 20 is provided (FIG. 2).

Subsequently, the through-holes 22 and 38A of the connection members 21 and the voltage detection terminals 37, and the through-holes of the intermediate voltage detection terminals 43 in the cell wiring module 20 are positioned to bolt holes of all electrode terminals 12A to 12C of the plurality of single cells 11 (single cell group). The cell wiring module 20 is then attached to the plurality of single cells 11 (FIG. 1). Thereafter, bolts are screwed to all the nut-shaped electrode terminals 12A to 12C to provide the cell module 10.

The configuration according to the embodiment above achieves effects below.

(1) The cell wiring module 20 has the plurality of connection members 21 connecting the adjacent electrode terminals 12A and 12B of the plurality of single cells 11 having the positive and negative electrode terminals 12A and 12B; the plurality of holding portions 24 holding the connection members 21; the voltage detection terminals 37 (detection terminals) placed on the connection members 21 and connected to the terminal portions of the wires W1 (wires); and the wire insertion portions 36 through which the wires connected to the voltage detection terminals 37 are inserted. The wires W1 extend from the voltage detection terminals 37 in the direction X1 (X2) inclined relative to the front-rear direction Y (direction orthogonal to the connecting direction of the connection members 21). The wires W1 extending in this direction are inserted through the wire insertion portions 36.

Compared to a case where the wires W1 extend in the front-rear direction Y (direction orthogonal to the connecting direction of the connection members 21), it is unnecessary to secure a space in the front-rear direction Y (direction orthogonal to the connecting direction) of the connection members 21 in the configuration above. Thus, the cell wiring module 20 can be reduced in size.

(2) When the wires W1 extend in the left-right direction (connecting direction of the connection members 21), the wires W1 are likely to be long. In the present embodiment, however, the wires W1 do not extend in the connecting direction of the connection members 21 and thus can be inhibited from being lengthened.

(3) The wire insertion portions 36 are provided along the plurality of holding portions 24, and the wires W1 extend toward the wire insertion portions 36.

When the wires W1 extend opposite to the wire insertion portions 36, the wires W1 are lengthened. In the present embodiment, however, the length of the wires W1 can be shortened.

(4) The holding portion 24 has the partition wall 27 separating the connection member 21 from the exterior. The voltage detection terminal 37 has the flat plate portion 38 placed on the connection member 21. The corner portions of the flat plate portion 38 are inserted in the partition wall 27. This enables the size of the cell wiring module 20 to be reduced by an amount that the corner portions of the flat plate portion 38 are inserted in the partition wall 27.

(5) The partition wall 27 has the recesses 27A to 27C, 28A, and 28B to which the corner portions of the flat plate portion 38 are fitted. The simple configuration enables the size of the cell wiring module 20 to be reduced, and the recesses 27A to 27C allow positioning of the voltage detection terminal 37 (detection terminal).

(6) The inner surface of the partition wall 27 has the through-holes 27D and 28D (through-recesses) through which the corner portions of the flat plate portion 38 are inserted. The simple configuration enables the size of the cell wiring module 20 to be reduced, and allows positioning of the voltage detection terminal 37 (detection terminal).

(7) The through-holes 27D and 28D are through-holes passing through the partition wall 27. This enables a further reduction in the size of the cell wiring module 20.

(8) The partition wall 27 has the auxiliary wall 32 on the outer surface side of the partition wall 27, the auxiliary wall 32 covering the corner portions of the flat plate portion 38 inserted through the through-holes 27D and 28D.

When the flat plate portion 38 is exposed to the exterior, insulation performance becomes a concern. In the present embodiment, however, the insulation performance can be prevented from deteriorating.

(9) The plurality of holding portions 24 have the plurality of voltage detection terminals 37 placed on the connection members 21. Of the plurality of voltage detection terminals 37, the wire W1 from the voltage detection terminal 37B in the left end portion (first end portion) in the left-right direction (connecting direction of the connection members 21) extends to the right-hand (second) side in the left-right direction (connecting direction of the connection members 21).

In the end portion of the cell wiring module 20, the wire W1 may protrude from the cell wiring module 20 depending on the extending direction of the wire W1. According to the present embodiment, however, of the plurality of voltage detection terminals 37 (detection terminals), the wire W1 from the voltage detection terminal 37B in the left end portion (first end portion) in the left-right direction (connecting direction of the connection members 21) extends to the right-hand (second) side in the left-right direction (connecting direction of the connection members 21). This can prevent protrusion of the wire W1 from the cell wiring module 20.

(10) The cell wiring module 20 is configured by linking the plurality of link units, each link unit having the holding portion 24 and the wire insertion portion 36. When the link units are linked, the wire insertion portions 36 of the adjacent link units are connected.

In a case where the cell wiring module 20 is integrally molded, a new mold and the like are required to accommodate a change in the configuration of the cell wiring module 20 (change in the length or the like) associated with a change in the number of single cells 11. According to the present embodiment, however, the number of link units can be changed depending on the number of single cells 11, thus facilitating changes in the configuration of the cell wiring module 20.

<Second Embodiment>

Figure 11:
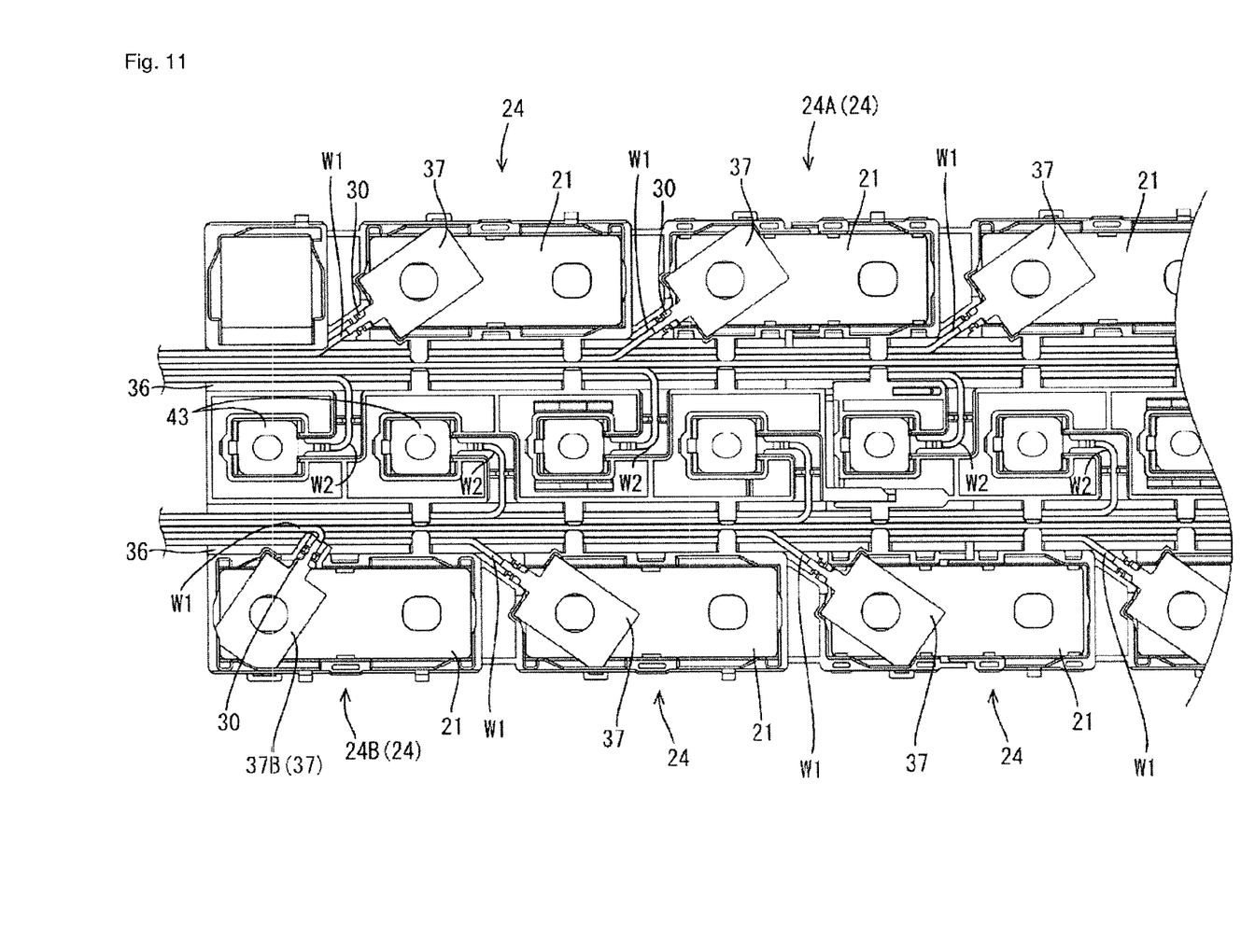
[FIG. 11] A plan view of a cell wiring module according to a second embodiment.

A second embodiment is described below with reference to FIG. 11. In the description below, configurations identical to those in the first embodiment are denoted with identical reference numerals and descriptions are excluded.

In the cell wiring module 20 of the first embodiment, the wires W1 and the wires W2 directed from the through-grooves 30 to the wire insertion portions 36 are folded and curved, and then are directed to the right-hand side of the wire insertion portions 36. In contrast, in a cell wiring module 50 according to the second embodiment, as shown in FIG. 11, the wires W1 and the wires W2 directed from the through-grooves 30 to the wire insertion portions 36 are slightly inclined from the through-grooves 30 (without being folded) and merged with the wire insertion portions 36, and then are directed to the left-hand side of the wire insertion portions 36.

<Other Embodiments>

The present invention is not limited to the embodiments described with reference to the descriptions and drawings above. For example, embodiments below are also included in the technical range of the present invention.

(1) In the embodiments above, the heteropolar electrode terminals 12A and 12B are connected (in series) by the connection members 21. However, the configuration is not limited to this, and homopolar electrode terminals 12A and 12A (12B and 12B) may be connected (in parallel). For example, other single cells 11 are additionally connected in parallel to the cell module 10 of the embodiments above, and the homopolar electrode terminals 12A and 12A connected in parallel may be connected by the plurality of connection members 21 (cell wiring module 20).

(2) The number of the single cells 11 included in the cell module 10 is not limited to the number in the embodiments above. The shape of the cell wiring module 20 may also be changed appropriately depending on the number of the single cells 11.

(3) In the embodiments above, the plurality of separately provided link units are linked to configure the cell wiring module 20. However, the configuration is not limited to this. For example, one (integrated type) connection plate may configure the cell wiring module, and the connection members 21 and the voltage detection terminals 37 may be held by the plurality of holding portions 24 in the connection plate.

(4) The extending direction of the wires W1 from the voltage detection terminals 37 is not limited to the direction in the embodiments above. Instead, the wires W1 may be inclined relative to at least the front-rear direction Y (direction orthogonal to the connecting direction of the connection members 21).

(5) In the configuration in the embodiments above, the voltage detection terminals 37 are provided. However, the configuration is not limited to this, and a detection terminal may be provided to detect a status of the single cell 11 other than a voltage, such as a current or the like.

(6) In the embodiments above, the partition wall 27 has the through-hole through which the corner portion of the voltage detection terminal 37 is inserted. However, the configuration is not limited to this. A through-recess (not passing through the partition wall 27) may be provided on an interior surface of the partition wall 27 to fit the corner portion of the voltage detection terminal 37.

REFERENCE SIGNS LIST

10: Cell module
11: Single cell
12A, 12B: Electrode terminal
12: Intermediate electrode
20: Cell wiring module
20A: Housing member
21: Connection member
24 (24A, 24B): Holding portion
25: Bottom plate
27: Partition wall
27A to 27C, 28A, 28B: Recess
27D, 28D: Through-hole (through-recess)
29: Lock piece
30: Through-groove
32: Auxiliary wall
36: Wire insertion portion
37 (37A, 37B): Voltage detection terminal (detection terminal)
38: Flat plate portion
38A: Through-hole
39: Connection portion
43: Intermediate voltage detection terminal
45: Terminal housing
45A: Mount recess
W1: Wire (connected to the voltage detection terminal)
W2: Wire (connected to the intermediate voltage detection terminal)

The invention claimed is:

1. A cell wiring module, comprising:
a plurality of connection members connecting adjacent electrode terminals of a plurality of single cells having positive and negative electrode terminals;
a plurality of holding portions holding the connection members;
detection terminals placed on the connection members and connected to terminal portions of wires; and
wire insertion portions through which the wires connected to the detection terminals are inserted, wherein
the detection terminals are oriented in a direction inclined relative to a direction orthogonal to a connecting direction in which the connection members are arranged side-by-side, and
the detection terminals including corner portions that are inserted in the holding portions.

2. The cell wiring module according to claim 1, wherein the wires do not extend in the connecting direction of the connection members.

3. The cell wiring module according to claim 1, wherein the wire insertion portions are provided along the plurality of holding portions, and the wires extend toward the wire insertion portions.

4. The cell wiring module according to claim 1, wherein the holding portion has a partition wall separating the connection member from an exterior, the detection terminal has a flat plate portion placed on the connection member, and corner portions of the flat plate portion are inserted in the partition wall.

5. The cell wiring module according to claim 4, wherein the partition wall has recesses to which the corner portions of the flat plate portion are fitted.

6. The cell wiring module according to claim 4, wherein an inner surface of the partition wall has through-recesses through which the corner portions of the flat plate portion are inserted.

7. The cell wiring module according to claim 6, wherein the through-recesses are through-holes passing through the partition wall.

8. The cell wiring module according to claim 7, wherein the partition wall has an auxiliary wall on an outer surface side of the partition wall, the auxiliary wall covering the corner portions of the flat plate portion inserted through the through-holes.

9. The cell wiring module according to claim 1, wherein
the plurality of holding portions have the plurality of detection terminals placed on the connection members, and
of the plurality of detection terminals, the wire from the detection terminal in a first end portion in the connecting direction of the connection members extends to a second side in the connecting direction of the connection members.

10. The cell wiring module according to claim 1, wherein the cell wiring module is configured by linking a plurality of link units, each link unit having the holding portion and the wire insertion portion, and when the link units are linked, the wire insertion portions of the adjacent link units are connected.

11. The cell wiring module according to claim 1, wherein the terminal portions of the wires that are connected to the detection terminals extend in the inclined direction from the detection terminals toward the wire insertion portions.

12. The cell wiring module according to claim 11, wherein the terminal portions of the wires are inserted through grooves formed in the holding portions.

13. The cell wiring module according to claim 1, wherein the central axes of the detection terminals are inclined relative to the direction orthogonal to the connecting direction.

* * * * *